United States Patent

[11] 3,615,854

[72] Inventor Albert Christiaan Aten
Emmasingel, Eindhoven, Netherlands
[21] Appl. No. 747,634
[22] Filed July 25, 1968
[45] Patented Oct. 26, 1971
[73] Assignee U. S. Philips Corporation
New York, N.Y.
[32] Priority Aug. 10, 1967
[33] Netherlands
[31] 6711002

[54] ELECTRODE SYSTEM EMPLOYING OPTICALLY ACTIVE GRAINS
7 Claims, 3 Drawing Figs.

[52] U.S. Cl. .......... 136/89
[51] Int. Cl. .......... H01l 15/02
[50] Field of Search .......... 136/89

[56] References Cited
UNITED STATES PATENTS

| | | | |
|---|---|---|---|
| 2,904,613 | 9/1959 | Paradise | 136/89 |
| 3,025,335 | 3/1962 | Ralph | 136/89 |
| 3,396,057 | 8/1968 | Webb | 136/89 |
| 3,480,818 | 11/1969 | Te Velde | 136/89 X |

*Primary Examiner*—Allen B. Curtis
*Attorney*—Frank R. Trifari

ABSTRACT: A radiation-responsive device, for example a radiation detector, photocell or photoresistor comprising a monolayer of electrically active grains embedded in a binder and a radiation-permeable electrode covering one side of the grains. The grains are divided into two groups each of which has a different photosensitivity or characteristic. Grains of one group are doped with one dopant to produce a grain which has a given photocharacteristic or resistance as a function of incident radiation while grains of the other group are doped with a different dopant so as to have a different photocharacteristic of resistance as a function of the incident radiation.

INVENTOR

ALBERT C. ATEN

BY

AGENT

ELECTRODE SYSTEM EMPLOYING OPTICALLY ACTIVE GRAINS

Figure 1:
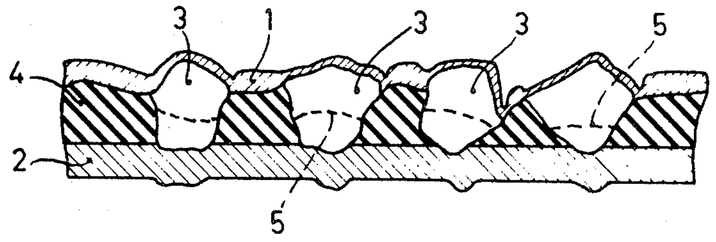

The invention relates to an electrode system comprising a layer of grains provided between two electrode layers which layer of grain has a thickness of approximately one grain and contains optically active grains which cohere by means of an insulating binder, at least one of the electrode layers being capable of passing radiation within a particular frequency range. The general structure of such systems and various methods of manufacturing same are described in great detail in copending applications, Ser. No. 569,204, filed Aug. 1, 1966, now U.S. Pat. No. 3,480,818, Ser. No. 569,170, filed Aug. 1, 1966, and Ser. No. 629,999, filed Apr. 11, 1967, the contents of which are hereby incorporated by reference.

The layer of grains which coheres by means of a binder and has a thickness of approximately one grain is hereinafter referred to as monograin layer.

Optically active grains are to be understood to mean herein grains in which by incident light either the impedance is varied, or an electric voltage is produced, or light emission is effected by the passage of current.

Electrode systems of the present type are to be considered inter alia for the use in radiation detectors, for example, photovoltage cells and photoresistors for exposure meters, in which radiation impinges upon a photosensitive monograin layer and produces therein electric voltage differences or impedance differences which are derived by means of the electrodes arranged on the layer, at least one of the electrodes being transparent to the incident radiation. Such electrode systems may also be used in the conversion of radiation energy into electrical energy, as takes place inter alia in solar batteries.

In all these cases it is of advantage to use monograin layers, since in that case the contact resistance between the grains are avoided and in addition the efficiency—due to the absence of grains screened against radiation by other grains—as well as the ratio (weight and material comsumption)/active surface area are as favorable as possible.

It is often desirable to use the photosensitive materials in the form of single crystals. However, some of these materials cannot be obtained in the form of sufficiently large single crystals or can be obtained in this form with great difficulty only, but they can be manufactured in a sufficiently pure form as a powder, consisting of monocrystalline grains. In such cases a layer of grains as described above may often be used instead of a comparatively large single crystal.

In using the electrode systems described in the preamble a few problems present themselves. For example, when used as a photoresistor the requirement is often imposed that the variation in the resistance which corresponds to the maximum intensity fluctuation in the particular frequency range, remains within fixed limits. In addition, the grains in the monograin layer of the electrode system often do not consist of such a substance, that the particular frequency range is sufficiently sensitively covered throughout its width.

One of the objects of the invention is to mitigate the abovementioned drawbacks. It is based inter alia on the discovery that a monograin layer, due to its favorable properties such as the absence of contact resistances between the grains and the lack of grains screened from radiation by other grains, is particularly suitable for use of a grain mixture.

Actually, in this case types of grains may be used having, for example, different values of the electrical resistance which enables an accurate control of the resistance of the electrode system since the grains in the monograin layer are not connected in series but in parallel.

Therefore, according to the invention an electrode system of the type mentioned in the preamble is characterized in that the optically active grains consist of a mixture of grains of two or more types which have different photocharacteristics.

The photocharacteristic of a grain is to be understood to mean herein the relation between the electrical conductance or the impedance of, and the voltage produced in, respectively, a grain of a type and the intensity of absorbed radiation having the wavelength hereof as a parameter and/or the wavelength of the absorbed radiation having the intensity hereof as a parameter and on the other hand the intensity and/or the spectral distribution of emitted radiation as a function of the passed current.

It has been found that for the preparation of grains having different photocharacteristics it is often sufficient already that one optically active basic material is doped differently.

Particularly suitable as optically active materials which may be used in electrode systems according to the invention are photosensitive materials of the type $A^{II} B^{VI}$, for example, sulfides, selenides and tellurides of zinc, cadmium and mercury, preferably cadmium sulfide.

If the $A^{II} B^{VI}$-compound(s) is (are) activated with copper, for example, approximately $10^{12}$ at. percent, the addition during the preparation of a small, for example, equal, quantity of Ga, In, A1, Ag, O, C1 or I can vary the resistance of the grains by some orders of magnitude.

It has been found that the use of mixtures of grains in electrode systems need not be restricted to homogeneous grains; for example, it is very well possible to vary the overall resistance of the grains by partially doping grains.

Figure 2:
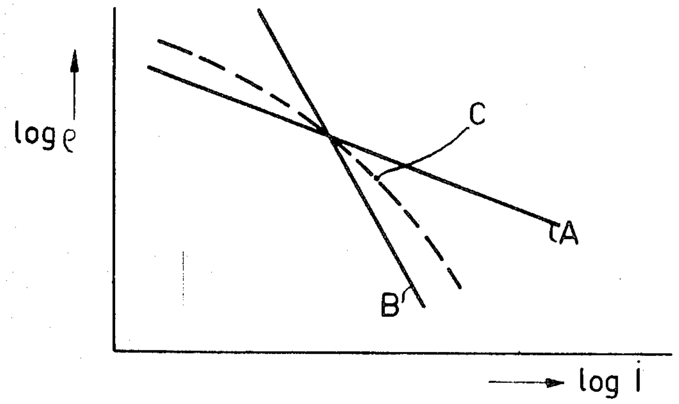
Figure 3:
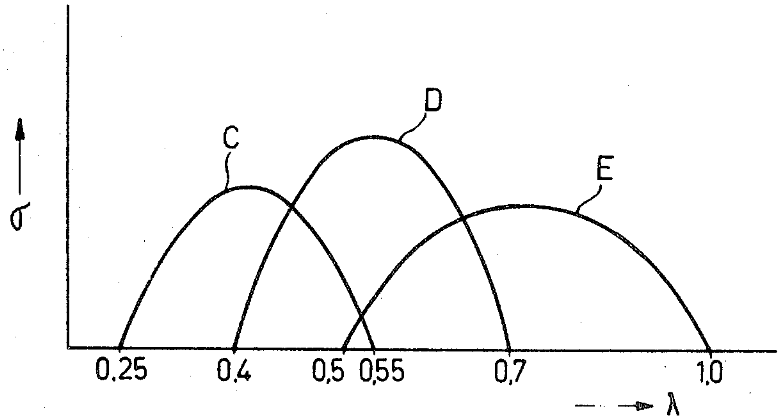

The invention will be described with reference to the accompanying drawing in which:

FIG. 1 diagrammatically shows an electrode system according to the invention,

FIGS. 2 and 3 diagrammatically show photocharacteristics of types of grains and mixtures of grains which are used in electrode systems according to the invention.

FIG. 1 shows an electrode system comprising a layer of grains 3 arranged between two electrode layers 1 and 2 and having the thickness of approximately one grain and containing optically active grains 3 which cohere by means of an insulating binder 4 while at least one of the electrode layers 1 is capable of passing radiation within a particular frequency range. The optically active grains 3 consist of a mixture of grains of two or more types having different photocharacteristics. The diameter of the grains is approximately 40 $\mu$m. The grains 3 consist of photosensitive cadmium sulfide which is doped with 0.1 to 0.01 at. percent copper, a part of which grains are partly doped in addition with 0.1 to 0.01 at. percent C1, which part is mixed with the other part which is used as such. The insulating binder 4 is a polyurethane resin and extends only over part of the layer thickness, so that parts of the grains 3 project from the binder thus enabling contact with the electrode layers 1 and 2. The electrode layer 2 is, for example, an indium layer, thickness 0.31$\mu$m, and the electrode layer 1 is, for example, also an indium layer, thickness 100 A. The broken line 5 denotes that the grains, or a part thereof, may be doped inhomogeneously.

FIG. 2 shows the photocharacteristic of the CdS types doped differently as described with reference to FIG. 1 and that in as far as the resistance depends upon the intensity at a particular wavelength. The said quantities, plotted on a double logarithmic scale, give an approximately linear relationship. Line A represents the CdS doped with Cu and C1 and line B represents the CdS doped with Cu alone. Both lines may be represented by the general formula:

$\rho$=constant. $I^{\gamma}$ wherein $\rho$=resistance

I=intensity $\gamma$=slope of the lines A and B, and is for line A—0.5 and for line B—1.

A mixture C which for a fraction $x$ consists of the grain-type A and for a fraction $(1-x)$ consists of the grain-type B has a photocharacteristic which is denoted by the broken line C and meets the relationship $$\frac{1}{\rho_C}=\frac{x}{\rho_A}+\frac{1-x}{\rho_B}$$

where $\rho_A$, $\rho_B$, $\rho_C$ are the resistance of the layer of grains if therein only grains of type A, of type B and of a mixture C, respectively, are present with a fraction $x$ of type A and $(1-x)$ of type B.

It is obvious from the latter formula that the broken line C passes through the point of intersection of the lines A and B and further tends to join line A or line B according as line A or line B denote a lower value of the resistance than line B and line A, respectively. For example illustrated in FIG. 2, with the resultant C being produced, the fraction $x$ of type A grains was one-tenth.

FIG. 3 shows the photocharacteristics of a few $A^{II}B^{VI}$-compounds inasfar as the photoconductivity power depends upon the wavelength λ at a given intensity. The sensitivity range of ZnS (curve C) extends, dependent upon the mode of preparation and so on, from a wavelength of approximately 0.25 μm to approximately 0.55 μm, that of CdS (curve D) from approximately 0.4 μm to approximately 0.7 μm and that of CdTe (curve E) from approximately 0.5 μm to approximately 1.0 m. For clarity the absolute scale of the photosensitive power of the three substances is not shown proportionately. A mixture of two of the said substances or of all three substances, will, of course, show a wider spectral sensitivity than any of the three substances individually.

It is obvious that the invention is not restricted to the examples described. Photosensitive substances, dopings, binders and diameters of the grains may be chosen, for example, within wide limits. Of course, the number of possibilities is considerably extended by not restricting to two-component mixtures, but using mixtures of three or more types of grains.

Although the invention is of particular interest for influencing photoconductivity, an EMF dependent upon the spectral intensity distribution may be produced by mixing types of grains which show a PN-junction with different photosensitivity exposed to the incident radiation. In this application a bias voltage in the reverse direction is preferably used.

Conversely it is possible by mixing different types of semiconductive grains which have a radiation-emitting PN-junction close to the surface in which the various types of grains emit radiation with different spectral distribution, to compose the color of the radiation emitted by the monograin layer upon passage of current.

What is claimed is:

1. A photosensitive electrode system comprising a layer of optically active grains cohering by means of an insulating binder, said layer being approximately one grain thick, electrode means for effecting electrical connection to opposite sides of the grains on opposite sides of the layer whereby the grains become connected in parallel between the electrode means, at least one of the electrode means being capable of passing radiation within at least a desired frequency range of the system, said grains consisting essentially of a mixture of at least first and second groups of grains, said first grain group consisting of photosensitive grains doped with a first dopant and having a first photocharacteristic of resistance as a function of intensity of incident radiation, said second grain group consisting of photosensitive grains with a second and different dopant and having a second photocharacteristic of resistance as a function of intensity of incident radiation, said second photocharacteristic being different from said first photocharacteristic, whereby the system exhibits an overall photocharacteristic that is the resultant of both the first and second photocharacteristics.

2. An electrode system as claimed in claim 1 wherein each of the grain group is an $A^{II}B^{VI}$-compound.

3. An electrode system as claimed in claim 2, wherein the $A^{II}B^{VI}$-compound is cadmiun sulfide.

4. An electrode system as claimed in claim 3, wherein grains of both groups are doped with Cu and the grains in one grain group are also doped with one or more of the elements Ga, In, Al, Ag, O, Cl and I.

5. A photosensitive electrode system comprising a layer of optically active grains cohering by means of an insulating binder, said layer being approximately one grain thick, electrode means for effecting electrical connection to opposite sides of the grains on opposite sides of the layer whereby the grains become connected in parallel between the electrode means, at least one of the electrode means being capable of passing radiation within at least a desired frequency range of the system, said grains consisting essentially of a mixture of at least first and second groups of grains, said first grain group consisting of grains doped with a first dopant and having a given spectral sensitivity over a first wavelength range, said second group consisting of grains doped with a second and different dopant and having a given spectral sensitivity over a second wavelength range, said second wavelength range including wavelengths not within the first wavelength range, whereby the system exhibits a spectral sensitivity over a third wavelength range embracing both the first and second wavelength ranges.

6. An electrode system as claimed in claim 5 wherein the grains are of $A^{II}B^{VI}$-compounds.

7. A radiation-generating electrode system comprising a layer of optically active grains cohering by means of an insulating binder, said layer being approximately one grain thick, electrode means for effecting electrical connection to opposite sides of the grains on opposite sides of the layer whereby the grains become connected in parallel between the electrode means, at least one of the electrode means being capable of passing radiation within at least a desired frequency range of the system, said grains consisting essentially of a mixture of at least first and second groups of grains, said first grain group consisting of grains doped with a first dopant and emitting radiation over a first wavelength range, said second grain group consisting of grains doped with a second and different dopant emitting radiation over a second wavelength range, said second wavelength range including wavelengths not within the first wavelength range, whereby the system exhibits radiation emission over a third wavelength range embracing both the first and second wavelength ranges.

* * * * *

PO-1050 (5/69)

UNITED STATES PATENT OFFICE
CERTIFICATE OF CORRECTION

Patent No. 3,615,854 Dated October 26, 1971

Inventor(s) ALBERT CHRISTIAAN ATEN

It is certified that error appears in the above-identified patent and that said Letters Patent are hereby corrected as shown below:

Column 2, Line 15, "$10^{12}$" should be --$10^{-2}$--;

Line 48, "o.31μm" should be --0.3μm--;

Column 3, Line 18, "1.0m." should be --1.0μm.--

Signed and sealed this 9th day of May 1972.

(SEAL)
Attest:

EDWARD M.FLETCHER,JR.
Attesting Officer

ROBERT GOTTSCHALK
Commissioner of Patents